UNITED STATES PATENT OFFICE.

THEODORE A. HAVEMEYER, I. LAURENCE ELDER, AND CHARLES F. LOOSEY, OF NEW YORK, N. Y., ASSIGNEES OF CARL KRONIG.

IMPROVEMENT IN THE MANUFACTURE OF SUGAR-MOLDS AND OTHER ARTICLES.

Specification forming part of Letters Patent No. 43,376, dated June 28, 1864; Reissue No. 2,919, dated April 14, 1868.

*To all whom it may concern:*

Be it known that I, CARL KRONIG, of Vienna, in the Empire of Austria, have invented a new and useful Process for Making Sugar-Molds, and other articles, of paper, or the material thereof; and I do hereby declare that the following is a full, clear, and exact description thereof.

My invention, which relates to the making of vessels and other articles, consists in making such vessels or other articles of paper, paper-stock, or pasteboard, united with any suitable cement, or molded and then dipped in linseed or equivalent oil, and dried, and then, for certain purposes, coated with a paste consisting of red lead and oil, either on the inside or the outside, or both, and finally varnished.

For making hollow vessels, such, for instance, as sugar-molds, if I use paper, I cut it into suitable forms and lap and double it, and, with any suitable cement, unite the several layers into the form required; or, instead, I take pasteboard and cut it into strips of the form required and chamfer the edges, so that they can be lapped and cemented together; and, if the pasteboard be not sufficiently thick, I use two or more thicknesses, cemented the one over the other, taking care to break joints; or I mold the shape required out of paper-stock, the cementing matter of the pulp being sufficient to produce the required adhesion; and after the required thickness has been obtained and the cementing matter dried, the vessel or other article is dipped in linseed or equivalent oil, and well saturated and dried, which will be best done at a temperature of about 135° Fahrenheit's scale.

For sugar-molds and other vessels for containing hot liquids, and such like uses, I then coat the surface with a paste made of red lead and oil to fill up the irregularities, and, when dry, grind and smooth the surface so coated, and then, finally, coat the surface with any suitable varnish which will resist the heat and moisture to which the vessel may be exposed in use.

In forming articles according to my said invention, the shaping will be facilitated by wetting the paper or pasteboard.

What I claim as my invention, and desire to secure by Letters Patent, is—

1. The process, substantially as herein described, for making vessels and other articles, which process consists in saturating with linseed or equivalent oil vessels or articles made of paper or equivalent substance, in manner substantially as described.

2. And I also claim coating articles which have been made as herein described, and which have been saturated with oil, with a paste of red lead and oil, and then varnishing the same, substantially as described.

CARL KRONIG.

Witnesses:

DAVID F. KORHAMMER,
FRANCIS EDER.